United States Patent [19]
Ward

[11] Patent Number: 5,353,540
[45] Date of Patent: Oct. 11, 1994

[54] ROTATABLE FISHING LURE

[76] Inventor: Fred L. Ward, 1009 E. LeMarche Ave., Phoenix, Ariz. 85022

[21] Appl. No.: 126,098

[22] Filed: Sep. 22, 1993

Related U.S. Application Data

[63] Continuation of Ser. No. 982,628, Nov. 27, 1992, abandoned.

[51] Int. Cl.$^5$ .............................................. A01K 85/12
[52] U.S. Cl. .................. 43/42.24; 43/42.26; 43/42.19
[58] Field of Search .................. 43/42.32, 42.34, 42.19

[56] References Cited

U.S. PATENT DOCUMENTS

| | | | |
|---|---|---|---|
| D. 239,281 | 3/1976 | Williams | 43/42.24 X |
| D. 316,289 | 4/1991 | Smith | D22/127 |
| 2,516,039 | 7/1950 | Wysack | 43/42.37 |
| 3,012,358 | 12/1961 | Multanen | 43/42.28 |
| 3,100,360 | 8/1963 | Creme | 43/42.24 |
| 3,390,478 | 7/1968 | McKnight et al. | 43/42.34 |
| 3,631,626 | 1/1972 | Keenan | 43/42.34 |
| 3,959,912 | 6/1976 | Lee | 43/42.37 X |
| 4,619,069 | 10/1986 | Strickland | 43/42.26 |
| 4,926,578 | 5/1990 | Morse et al. | 43/42.24 |
| 4,993,183 | 2/1991 | Carver | 43/42.24 X |
| 5,121,567 | 6/1992 | Boone | 43/42.24 |

FOREIGN PATENT DOCUMENTS 2647636 12/1990 France ................................ 43/42.24

OTHER PUBLICATIONS

Bass Pro Shops 1990 catalog, p. 141, "Pro Trailer".
Bass pro Shops, Outdoor World 1990 Catalog, p. 221.

*Primary Examiner*—P. Austin Bradley
*Assistant Examiner*—Jeanne M. Elpel
*Attorney, Agent, or Firm*—William E. Noonan

[57] ABSTRACT

A rotatable fishing lure which includes an elongate central member that is selectively engaged by a fish hook having a point and an eyelet formed at opposite ends such that a first part of the hook proximate the point is embedded in a lower end portion of the central member and a second part of the hook proximate the eyelet is embedded in an opposite upper end portion of the central member. One or more spiral arms are attached to and extend outwardly from the central member and are responsive to a pulling force exerted on a fishing line secured to the eyelet of the hook for causing the lure to rotate about an axis of the central member.

20 Claims, 2 Drawing Sheets

ROTATABLE FISHING LURE

This application is a file wrapper continuation of U.S. patent application Ser. No. 07/982,628, filed on Nov. 27, 1992, now abandoned.

FIELD OF THE INVENTION

This invention relates to a fishing lure and to a rotatable fishing rig that incorporates such a lure.

BACKGROUND OF THE INVENTION

Numerous types of fishing lures have been developed over the years. It has long been recognized that such lures are more attractive to fish and therefore more effective if they are pulled or jigged through the water. Such action enables the lure to simulate the movement of live bait. Mechanically movable lures have also been introduced in an attempt to attract fish. However, these devices employ a fairly complex and expensive construction and require a battery power source.

SUMMARY OF INVENTION

It is therefore an object of this invention to provide an improved fishing lure that effectively attracts fish by simulating the movement of live bait.

It is a further object of this invention to provide a fishing lure that automatically spins or rotates as it is jigged or pulled through the water being fished.

It is a further object of this invention to provide an improved Texas rig-style fishing apparatus that may be used effectively for various types of fishing.

It is a further object of this invention to provide a fishing lure that avoids entanglement with weeds and other underwater obstructions.

This invention results from a realization that a fishing rig and lure will exhibit increased movement and therefore be more attractive to fish by constructing them to spin or rotate in a propeller-like manner as the rig and lure are pulled or jigged through the water being fished.

This invention features a rotatable fishing lure including an elongate central member that is selectively engaged by a fish hook having a point and an eyelet formed at opposite ends. A first part of the hook proximate the point is embedded in a lower portion of the central member and a second part of the hook proximate the eyelet is embedded in an opposite upper end portion of the central member. Spiral arm means are attached to and extend outwardly from the central member. The spiral arm means are responsive to a pulling force exerted on a fishing line secured to the eyelet of the hook for causing the lure to rotate about an axis of the central member.

In a preferred embodiment the central member and the spiral arm means are integrally interconnected and comprise a flexible, resilient material. The spiral arm means may be attached to the central member proximate the lower end portion of the central member. Preferably, the spiral arm means include light-reflective particulate matter for attracting fish as the lure is pulled through the water.

This invention also features a rotatable fishing rig that includes a fish hook having a point and an eyelet formed at opposite ends thereof. There are swivel means for interconnecting the eyelet of the hook and one end of a fishing line. A lure apparatus, as previously described, is secured to the hook in the manner of a Texas rig. As a result, the lure is responsive to a pulling force exerted on the fishing line for causing the lure and the fish hook to rotate relative to the fishing line about an axis of the central member of the lure apparatus.

DETAILED DESCRIPTION OF PREFERRED EMBODIMENTS

Other objects, features and advantages will occur from the following description of preferred embodiments and the accompanying drawings, in which.

Figure 1:
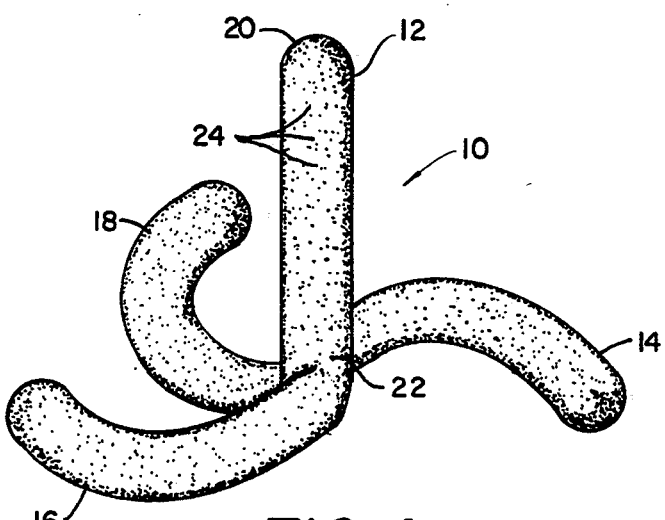
FIG. 1 is an elevational side view of a preferred rotatable lure according to this invention.
Figure 2:
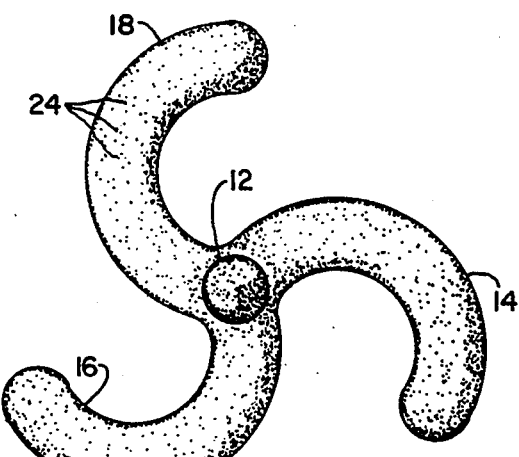
FIG. 2 is a bottom plan view of the lure of FIG. 1.
Figure 3:
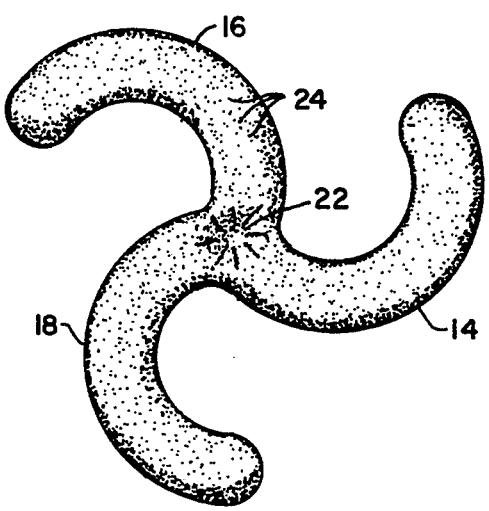
FIG. 3 is a top plan view of the lure of FIGS. 1 and 2.

There is shown in FIGS. 1-3 a fishing lure 10, which includes an elongate central member 12 and a plurality of spiral arms 14, 16 and 18 that extend outwardly from central portion 12. More particularly, central member 12 includes a somewhat rounded upper end portion 20 and a lower end portion 22. Spiral arms 14, 16 and 18 are integrally secured to lower end portion 22.

Lure 10 may be constructed utilizing a variety of known molding, cutting or other manufacturing techniques. The lure comprises a flexible, resilient material such as a rubber or soft plastic. Typically, a clear plastic is used. As that material is poured into a mold, light-reflective particulate matter 24 is added thereto. As a result, the finished lure 10 includes particulate material 24 dispersed therethrough. Such material, which may include the glitter or sparkle-like particles that are used in art work tends to reflect light, particularly when the lure is pulled through the water. This causes the lure to be more attractive to fish.

Figure 4:
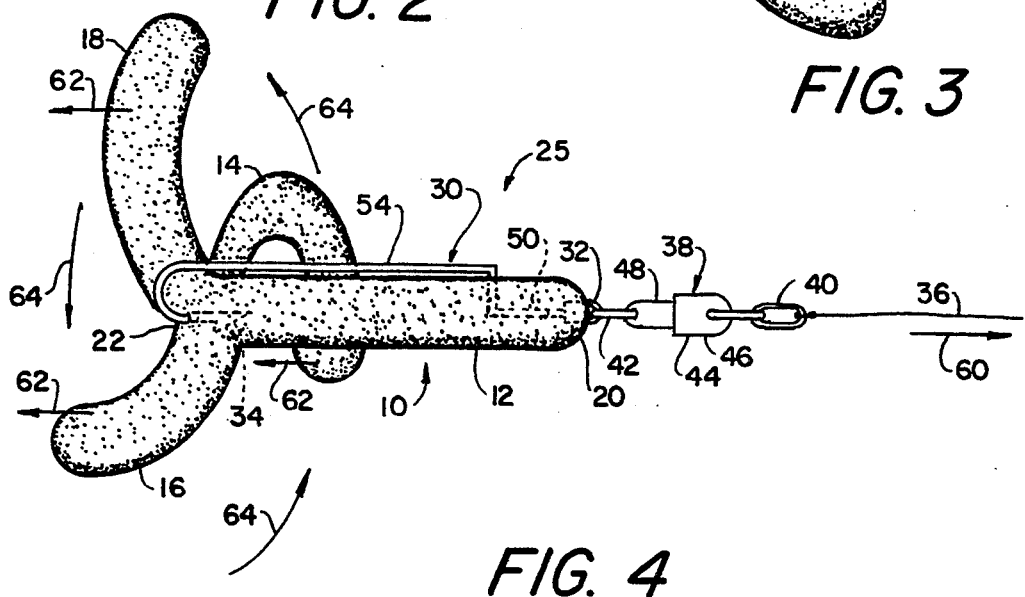
FIG. 4 is a perspective view of a Texas rig utilizing the lure of FIGS. 1-3.

Lure 10 is employed to construct a rotatable Texas rig 25 in the manner shown in FIG. 4. In addition to lure 10 the rig includes a fishing hook 30 having an eyelet 32 formed at its upper end and a point 34, shown in phantom, formed at its opposite end. Hook 30 is secured to a conventional fishing line 36 by a swivel apparatus 38. In particular, apparatus 38 includes a first ring 40 that is tied or otherwise attached to line 36, a second ring 42 that is engaged with eyelet 32 and a swivel member 44 that interconnects rings 40 and 42. Swivel member 44 includes a first portion 46 having an opening that receives ring 40 and a second portion 48 that is rotatably or swivelably secured to portion 46. Swivel member 44 comprises a conventional off-the-shelf item that can be found in many hardware stores and tackle shops.

Hook 30 is engaged with lure 10 in the manner of a Texas rig. In particular, pointed end 34 of hook 30 is first inserted through upper end region 20 of central member 12. The pointed portion then exits the side of the central member proximate upper portion 20, hook 30 is drawn through the central member and point 34 is embedded in lower region 22. With hook 30 so engaged, eyelet 32 is partially embedded in upper region 20 of central portion 12. Hook 30 is bent or angled along portion 50 such that hook 30 exits central member 12 at the same location that point 34 exits the central portion as the hook is being engaged with the lure. The body or shaft 54 of hook 30 extends beside and generally parallel to central member 12.

After lure 10 has been engaged with hook 30 in the above described manner, the completed rig 25 is ready to be used for fishing. In operation, the fisherman casts or lowers rig 25 into the water to be fished. Line 36 is then pulled or jigged in the direction of arrows 60. Although arrows 60 are depicted as extending generally horizontally, it should also be understood that rig 25 may be jigged vertically or in other directions. As rig 25 is pulled, the water causes spiral arms 14, 16 and 18 to flex, as indicated by arrows 62. This creates a pitch or a screw-like effect, which causes the spiral arms to rotate or spin in the propeller-like manner indicated by arrows 64. As a result, lure 10 and attached hook 30 spin in the direction of arrows 34 about an axis of central member 12. Swivel means 38 allows the hook and lure to spin independently of line 36. In other words, the line does not twist or wind as the lure and hook rotate. This is permitted because ring 42 and portion 48 of swivel means 38 rotate with eyelet 32 of hook 30 but pivot relative to portion 46 of swivel 44. In any event, the resulting rotation or propeller-like movement of lure 10 makes the lure increasingly attractive to fish.

Figure 5:
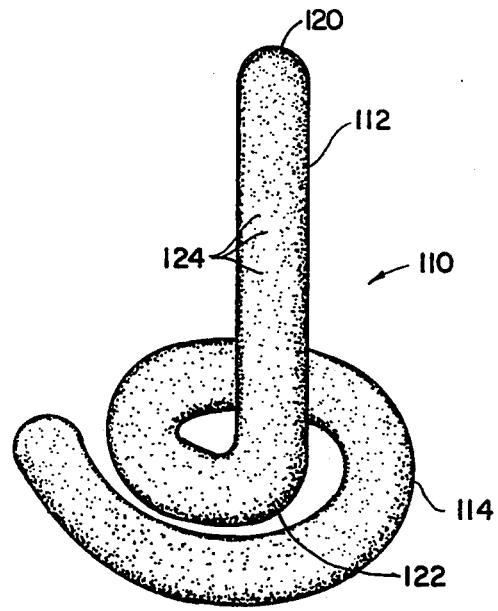
FIG. 5 is a perspective view of an alternative rotatable lure according to this invention.

An alternative rotatable lure 110 is depicted in FIG. 5. Lure 110 similarly includes a central member 112 having a rounded upper end portion 120 and a lower end portion 122. A single spiral arm 114 is integrally connected to lower portion 122 and extends therefrom about central portion 112. Again, lure 110 may comprise a flexible, resilient material such as a soft plastic and may further comprise reflective particles 124 that are disposed through central member 112 and spiral arm 114.

Figure 6:
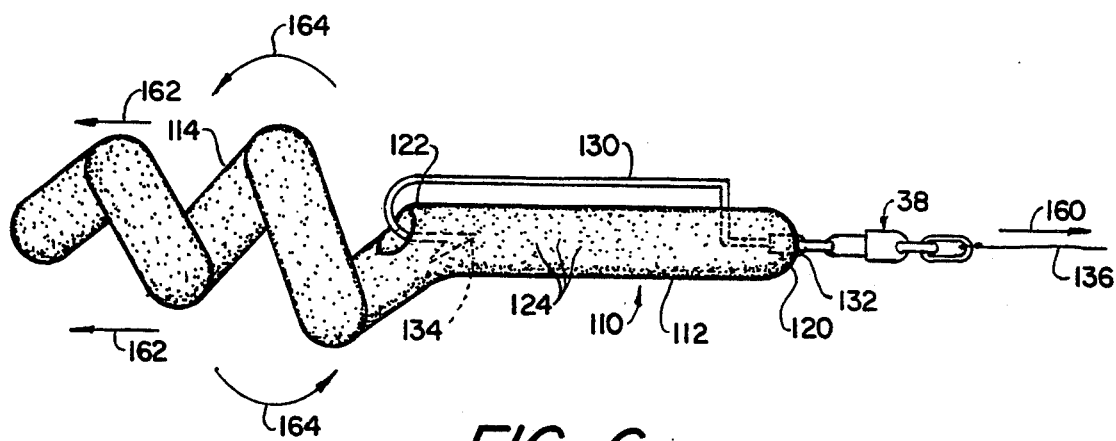
FIG. 6 is a perspective view of a rotatable Texas rig constructed utilizing the lure of FIG. 5.

As illustrated in FIG. 6, a hook 130 analogous to that described above, is engaged with lure 110 in a Texas rig-style arrangement. In particular, point 134 is embedded in the lower end portion 122 of central member 112 and eyelet 132 is partially embedded in upper portion 120. A swivel 38, as previously described, interconnects eyelet 132 and fishing line 136.

In operation, line 136 is pulled or jigged in the direction of arrows 160. This causes spiral arm 114 to flex or extend rearwardly as indicated by arrows 162. This creates a pitch, which causes the hook 130 and lure 110 to rotate in the direction of arrows 164 generally about the axis of central member 112. As a result, when the rig 25 is pulled in the direction of arrows 160, lure 110 spins in a propeller-like manner and is increasingly attractive to fish. Again, in the embodiment illustrated in FIG. 6, swivel 38 permits the hook and lure to rotate without rotation or twisting of line 136. Reflective particulate matter 124 again draws fish to the lure.

In each of the embodiments, the spiral arms are constructed such that the lure is weed resistent. In particular, spiral arms 14, 16 and 18 in the first embodiment and spiral arm 114 in the second embodiment have smoothly curved shapes that resist snagging with weeds and other underwater obstructions. The respective central members 12 and 112 are likewise shaped to move relatively snag free through the water. The soft, flexible and resilient composition of the lure further contributes to its weed resistance.

It has been determined that the lure and rig of this invention are effective for various types of fishing. For example, the lure can be fished on top of the water in a manner similar to a running bait or buzz bait. Alternatively, the lure may be fished under the water as a spinner bait. It may be skipped along the bottom as a worm, vertically jigged or employed in other manners known to those skilled in fishing.

Although specific features of the invention are shown in some drawings and not others, this is for convenience only, as each feature may be combined with any or all of the other features in accordance with the invention. Other embodiments will occur to those skilled in the art and are within the following claims.

What is claimed is:

1. A rotatable fishing lure for use in connection with a fish hook having a point and an eyelet formed at opposite ends, said lure comprising:
   an elongate, central member having a longitudinal axis, upper and lower end portions, and a side portion interconnecting said end portions, said central member being engaged by said fish hook such that a part of said hook proximate said eyelet is embedded in said upper end portion of said central member and said point of said hook is embedded in said lower end portion of said central member; and
   spiral arm means including at least one elongate spiral arm that has a proximal longitudinal end attached to and engaging said side portion of said central member and extending longitudinally radially outwardly to a distal longitudinal end that is spaced apart from said side portion, each said elongate spiral arm spirally winding around said longitudinal axis at least when said lure is at rest, said spiral arm means being responsive to a pulling force exerted on a fishing line secured to said eyelet of said hook for causing said lure to rotate about said longitudinal axis of said central member.

2. The lure of claim 1 in which said central member and said spiral means comprise a flexible, resilient material.

3. The lure of claim 1 in which said central member and said spiral means are unitarily interconnected.

4. The lure of claim 1 in which said spiral arm means are attached to said central member proximate said lower end portion of said central member.

5. The lure of claim 1 in which said central member and said spiral arm means include light reflective particulate material for attracting fish as the lure is pulled through the water.

6. The lure of claim 1 in which said spiral arm means include a plurality of spiral arms connected to said central member.

7. The lure of claim 1 in which said spiral arm means include a single spiral arm connected to said central member.

8. The lure of claim 7 in which said single spiral arm extends at least 180° about said central member.

9. A rotatable fishing rig comprising:
   a fish hook having a point and an eyelet formed at opposite ends thereof, and an intermediate shaft that interconnects said point and said eyelet;
   swivel means for interconnecting said eyelet of said hook to one end of a fishing line; and
   a lure apparatus including an elongate central member having a longitudinal axis, upper and lower end portions and a side portion interconnecting said end portions, said central member being selectively engaged by said fish hook such that said point is embedded in said lower end portion of said central member, a part of said hook proximate said eyelet is embedded in said upper end portion of said central member and said intermediate shaft extends largely outside of said central member, and spiral arm means attached to and extending radially outwardly from said side portion of said central member and spirally winding around said longitudinal axis, said spiral arm means being responsive to a pulling force exerted on said fishing line for causing said lure and said fish hook to rotate relative to said fishing line and about said longitudinal axis of said central member.

10. The rig of claim 9 in which said intermediate shaft includes a bent segment that extends from said eyelet generally transversely outwardly through said side portion of said central member, and an elongate, generally J-shaped segment that extends outside of said central member and interconnects said bent segment and said point of said hook.

11. The rig of claim 9 in which said central member and said spiral means comprise a flexible, resilient material.

12. The rig of claim 9 in which said central member and said spiral arm means are unitarily interconnected.

13. The rig of claim 9 in which said spiral arm means are attached to said central member proximate said lower end portion of said central member.

14. The rig of claim 9 in which said central member and said spiral arm means include light reflective particulate material for attracting fish when said lure is pulled through the water.

15. The rig of claim 9 in which said spiral arm means include a plurality of spiral arms connected to said central member.

16. The rig of claim 9 in which said spiral arm means include a single spiral arm connected to said central member.

17. The rig of claim 16 in which said single spiral arm extends at least 180° about said central member.

18. The lure of claim 9 in which said fish hook includes an intermediate shaft that interconnects said point and said eyelet, said shaft having a bent segment that extends from said eyelet generally transversely outwardly through said side portion of said central member, and an elongate, generally J-shaped that extends outside of said central member and interconnects said bent segment and said point of said hook.

19. The rig of claim 9 in which said spiral arm means include at least one elongate spiral arm having a proximal longitudinal end attached to an engaging said side portion of said central member, and extending outwardly to a distal second longitudinal end that is spaced apart from said side portion.

20. A rotatable fishing lure for use with a fish hook having a point and an eyelet formed at opposite ends, said fishing lure comprising:

an elongate central member having a longitudinal axis, upper and lower end portions and a side portion interconnecting said end portions, said central member being engaged by said fish hook such that a part of said hook proximate said eyelet is embedded in said upper end portion of said central member and said point of said hook is embedded in said lower end portion of said central member; and a single elongate spiral arm having a proximal longitudinal end attached to and engaging said side portion of said central member and extending longitudinally radially outwardly from said side portion of said central member to a distal longitudinal end that is spaced apart from said side portion, said spiral arm spirally winding around said longitudinal axis at least when said lure is at rest such that said spiral arm extends at least 180° about said central member, said central member and said spiral arm means being composed of a flexible, resilient material and said spiral arm being responsive to a pulling force exerted on a fishing line secured to said eyelet of said hook for causing said lure to rotate about said longitudinal axis of said central member.

* * * * *